(12) United States Patent
Judd et al.

(10) Patent No.: US 7,243,883 B2
(45) Date of Patent: Jul. 17, 2007

(54) BRACKET FOR RETAINING WIRES

(75) Inventors: James H. Judd, St. Charles, IL (US); Radoslaw K. Dzierzawski, Prairie View, IL (US); Rimas L. Petrosius, Carol Stream, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 83 days.

(21) Appl. No.: 11/190,661

(22) Filed: Jul. 27, 2005

(65) Prior Publication Data

US 2007/0023585 A1 Feb. 1, 2007

(51) Int. Cl.
*F16L 3/08* (2006.01)
(52) U.S. Cl. .................................... 248/74.1
(58) Field of Classification Search ................. 248/49, 248/74.1, 74.2, 71, 73, 65, 68.1, 229.1, 229.16, 248/229.26; 24/16 PB
See application file for complete search history.

(56) References Cited

U.S. PATENT DOCUMENTS

| | | | | |
|---|---|---|---|---|
| 3,521,332 A | * | 7/1970 | Kramer | 403/188 |
| 3,747,166 A | * | 7/1973 | Eross | 248/75 |
| 4,407,472 A | * | 10/1983 | Beck | 248/89 |
| 4,707,892 A | * | 11/1987 | Nelson | 24/336 |
| 5,908,179 A | * | 6/1999 | Fimbres | 248/51 |
| 6,375,129 B2 | * | 4/2002 | Koziol | 248/68.1 |
| 6,408,492 B1 | * | 6/2002 | Sparks et al. | 24/336 |
| 7,036,778 B2 | * | 5/2006 | Ferrell | 248/213.2 |
| 2004/0061038 A1 | * | 4/2004 | Solich | 248/444 |

\* cited by examiner

*Primary Examiner*—Ramon O Ramirez
(74) *Attorney, Agent, or Firm*—Elias P. Soupos; Susan L. Lukasik; Jeffrey P. Calfa

(57) ABSTRACT

An apparatus includes a bracket (110) that has at least one retainer (136) disposed on a first side of the bracket (110) and a mounting mechanism (134) disposed on a second side of the bracket (110) such that the mounting mechanism (134) grips a fluid rail (104). The at least one retainer (136) retains wires (112) adjacent to the bracket (110) and away from the fluid rail (104). The bracket (110) is disposed between the wires (112) and the fluid rail (104).

18 Claims, 6 Drawing Sheets

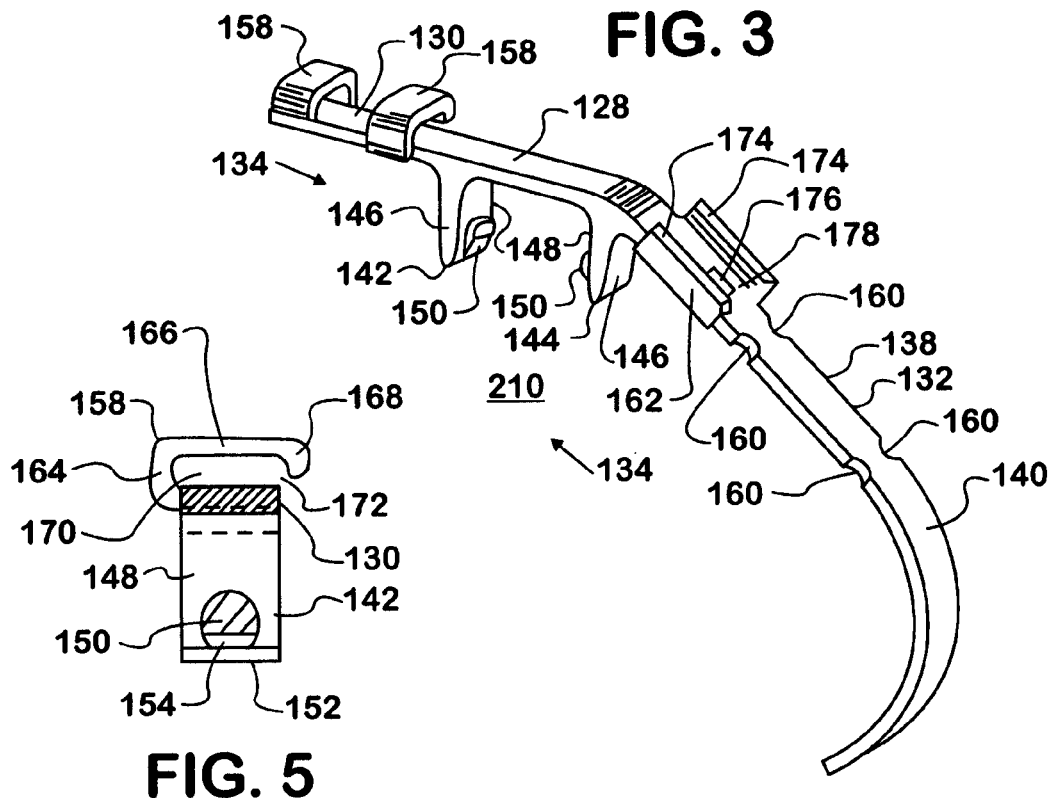
FIG. 3
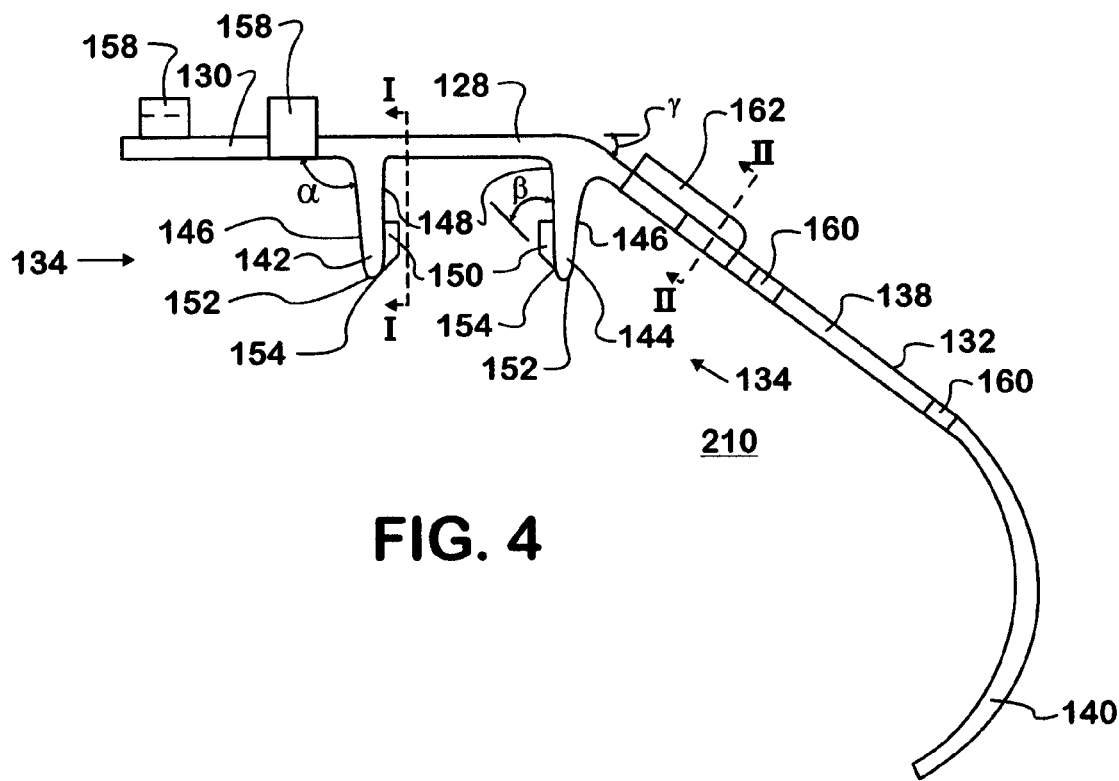
FIG. 5
FIG. 4

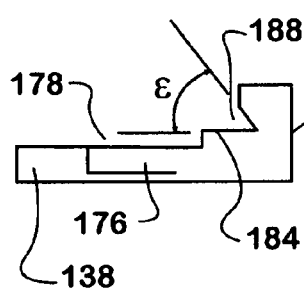
FIG. 10
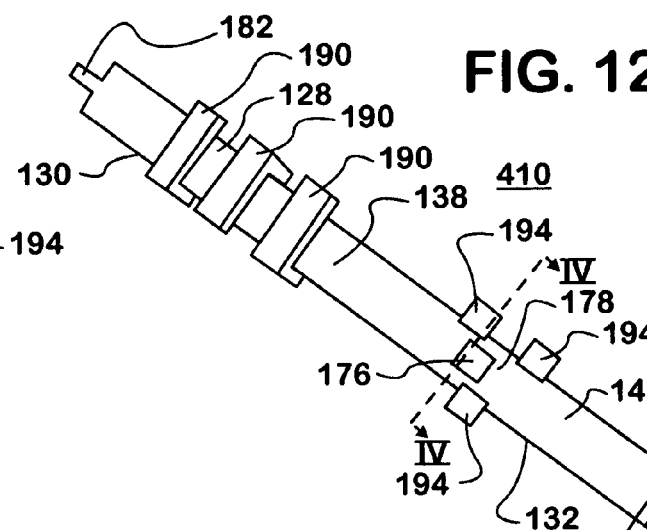
FIG. 12
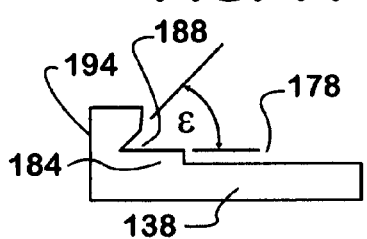
FIG. 11
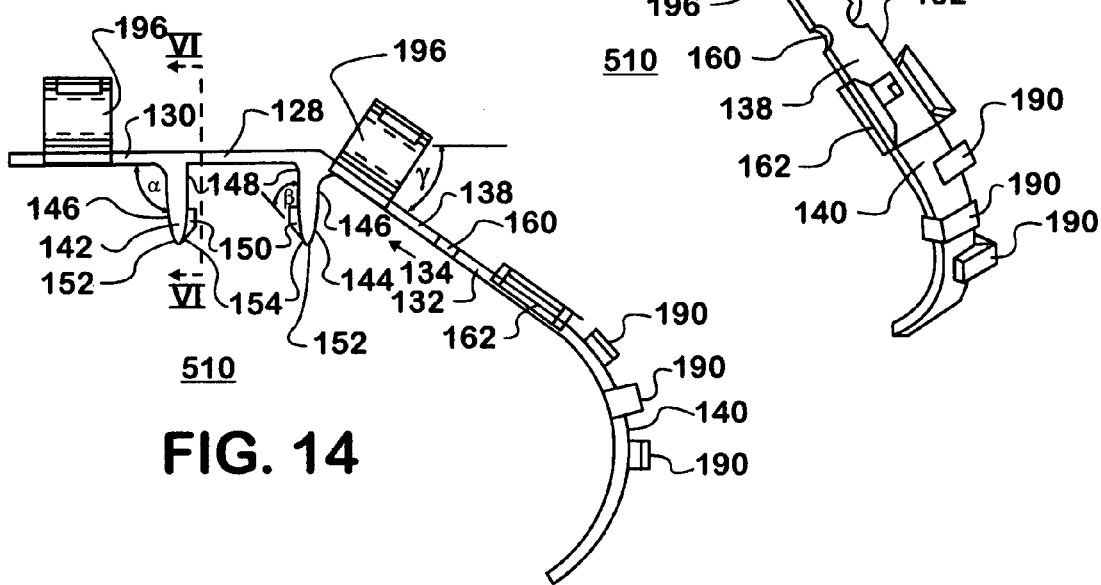
FIG. 13
FIG. 14

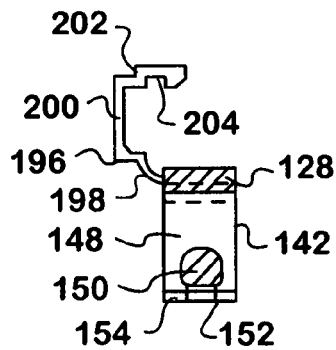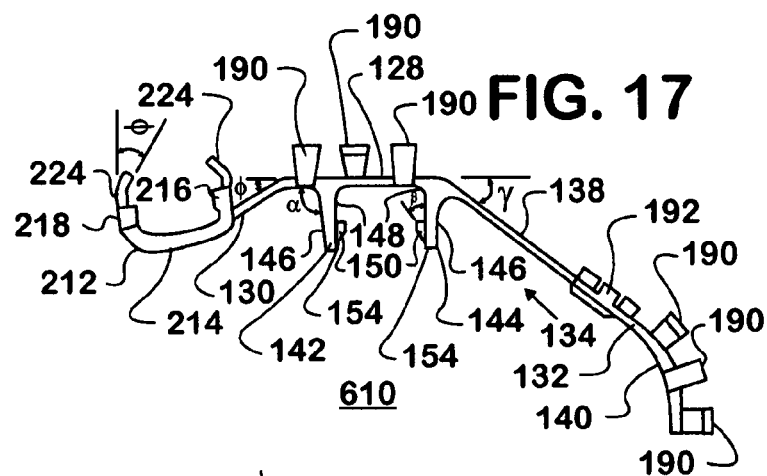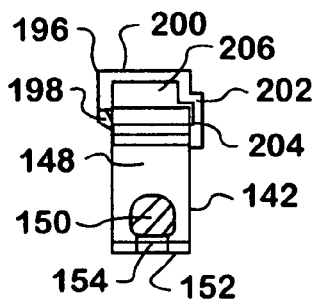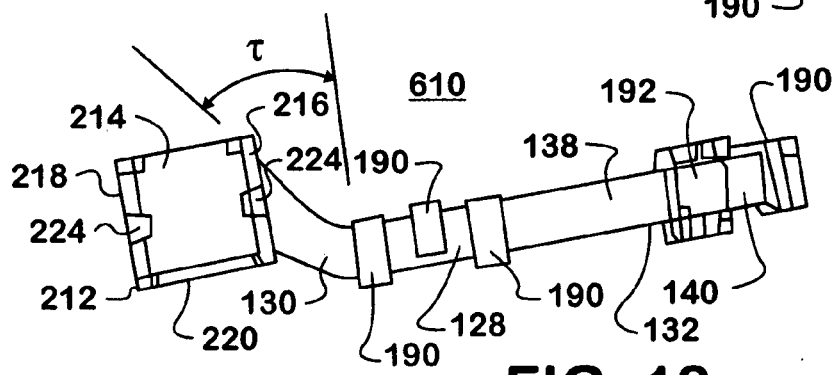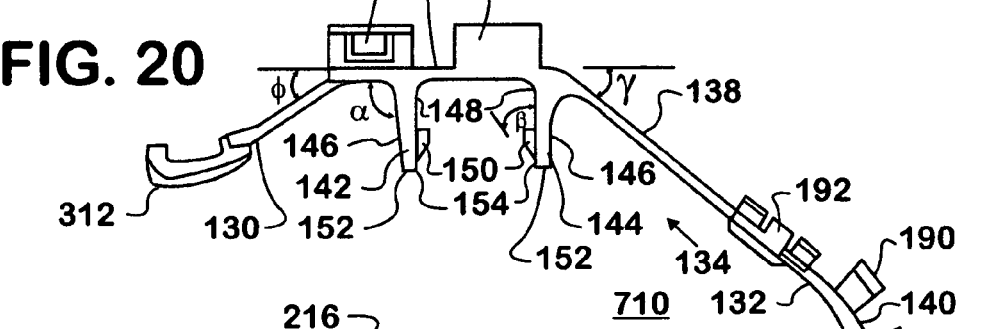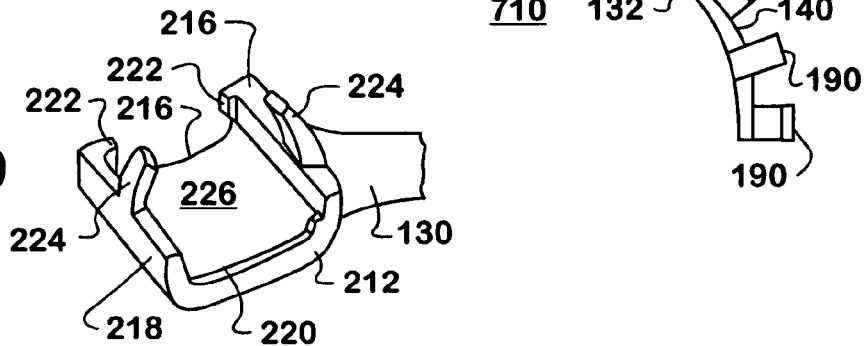

BRACKET FOR RETAINING WIRES

FIELD OF THE INVENTION

This invention relates to wiring systems, including but not limited to wiring systems for electronic fuel injection systems for internal combustion engines.

BACKGROUND OF THE INVENTION

Internal combustion engines are known to have wire routing systems, also known as wire harnesses, that connect an engine control module with one or more fuel injectors and/or one or more sensors.

The engine control module is known to direct commands through the wire routing system, for example, to electronically operate a fuel injection system that injects fuel into the cylinders. Typically, the fuel injection system has a fuel injector for each cylinder. The fuel injector injects fuel into the cylinder in response to commands from the engine control module or another electronic control device.

The fuel injectors are often disposed above the cylinders near the engine's valve operating mechanism, such as rocker arms, camshafts, push rods, and so forth. The valve operation mechanism operates the intake and exhaust valves for the cylinders. During engine operation, the wires may become entangled in the moving parts of the valve operation mechanism and may be damaged.

Accordingly, there is a need for a wiring system for an electronic fuel injection system, which wiring system avoids entanglements with the valve operation mechanism.

SUMMARY OF THE INVENTION

An apparatus includes a bracket that has at least one retainer disposed on a first side of the bracket and a mounting mechanism disposed on a second side of the bracket such that the mounting mechanism grips a fluid rail. The at least one retainer retains wires adjacent to the bracket and away from the fluid rail. The bracket is disposed between the wires and the fluid rail.

Optionally, the mounting mechanism of the bracket includes a first leg extending from a base and having a first protrusion and a second leg extending from the base and having a second protrusion. The first protrusion opposes the second protrusion. The bracket may include a base connected to an arm and an extension. One or more connector holders may be disposed on the bracket. A plurality of retainers may be disposed on alternating sides of the bracket.

BRIEF DESCRIPTION OF THE DRAWINGS

FIG. 3 is a perspective view of an alternative bracket for a wire routing system in accordance with the invention.

FIG. 4 is a side view of the bracket of FIG. 3 in accordance with the invention.

FIG. 5 is a cross-section view taken along line I-I of the bracket in FIG. 3 in accordance with the invention.

FIG. 10 is a cross-section view taken along line IV-IV of the bracket in FIG. 12 in accordance with the invention.

FIG. 11 is a cross-section view taken along line V-V of the bracket in FIG. 8 in accordance with the invention.

FIG. 12 is a top, back view of the bracket in FIG. 8 in accordance with the invention.

FIG. 13 is a perspective view of another bracket for a wire routing system in accordance with the invention.

FIG. 14 is a side view of the bracket in FIG. 13 in accordance with the invention.

FIG. 15 is a cross-section view taken along line VI-VI of the bracket in FIG. 14 in accordance with the invention.

FIG. 16 is a cross-section view of a closable clip of FIG. 15 in a closed position in accordance with the invention.

FIG. 17 is a side view of a further additional bracket for a wire routing system in accordance with the invention.

FIG. 18 is a top view of the bracket in FIG. 17 in accordance with the invention.

FIG. 19 is perspective front view of the bracket of FIG. 17 in accordance with the invention.

FIG. 20 is a side view of another embodiment of a bracket for a wire routing system in accordance with the invention.

DESCRIPTION OF A PREFERRED EMBODIMENT

The following describes an apparatus for and method of routing wires for electronic control of various engine components such as fuel injectors and/or sensors in an internal combustion engine. The wire routing system has one or more brackets that guide wires at least partially across a fluid rail and retain the wires adjacent to and away from the fluid rail, for example, when the fluid rail is disposed under a valve cover of the internal combustion engine. The wires may include injector wires that connect the engine control module with one or more actuating mechanisms in each fuel injector. The wires may also include sensor wires, for example, that connect the engine control module with one or more sensors.

Figure 1:
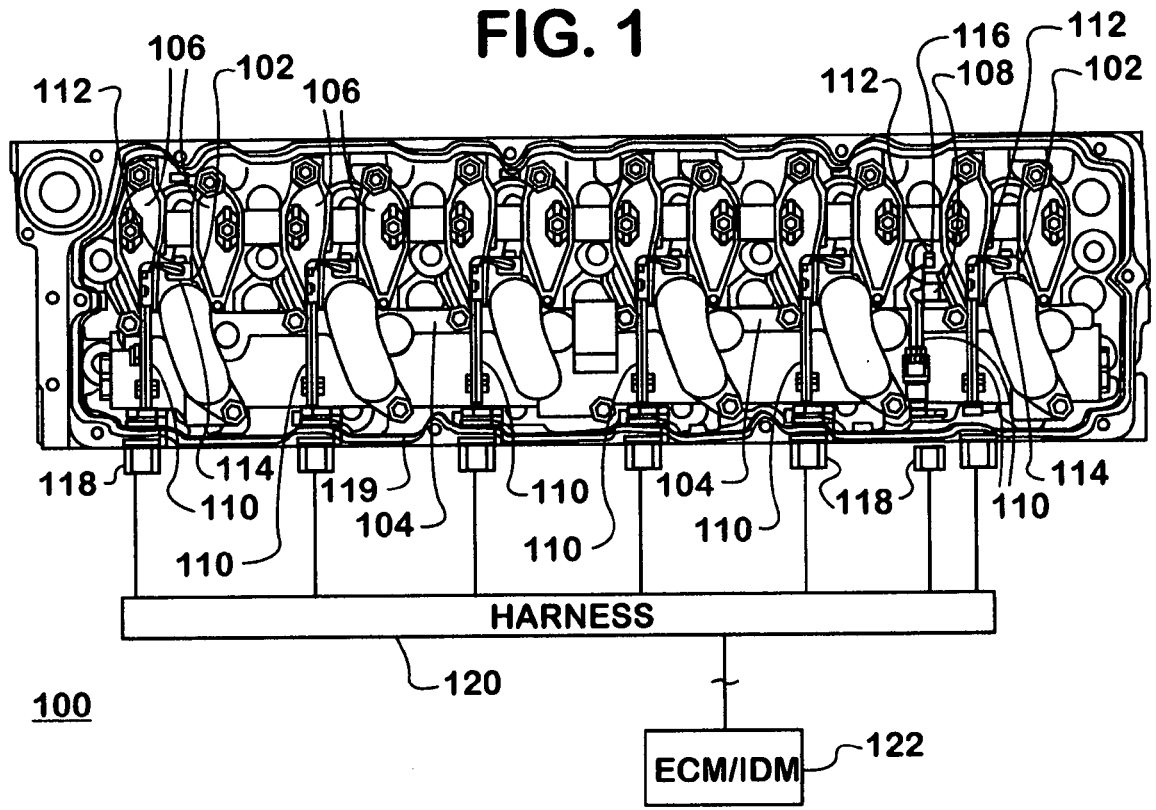
FIG. 1 is a diagram of a wire routing system for an electronic fuel injection system in an internal combustion engine in accordance with the invention.

A diagram of a wire routing system 100 for an electronically controlled fuel injection system is shown in FIG. 1. Such a wire routing system 100 may be used, for example, in an internal combustion engine. The wiring routing system 100 may route one or more wires 112 from an engine control module (ECM) and/or Injector Driver Module (IDM) 122 to each fuel injector 102. Electrical control signals are transmitted over the one or more wires 112 to control the operation of the fuel injector 102, as known in the art. The wire routing system 100 may also route one or more wires 112 from the ECM/IDM 122 to one or more sensors 108 positioned near the fuel injectors 102 or elsewhere under the valve cover of the engine. One example of such a sensor 108 may be an injector control pressure sensor. The ECM/IDM 122 may, for example, monitor electrical signals from the sensor(s) via such wire(s) 112.

The engine may have one or more fuel injectors 102 disposed near a fluid rail 104 and a valve operation mechanism 106. The fluid rail 104 may be a high-pressure or a low-pressure fluid rail, and may contain various types of fluids, such as engine lubricating oil, actuating oil, fuel, or other fluids. In the example shown in FIG. 1, the fluid rail 104 supplies fluid to the fuel injectors 102. The example valve operation mechanism 106 as shown in FIG. 1 comprises a plurality of rocker arms operated by push rods (not shown) as is known in the art. Other types of valve operating mechanisms, such as a camshaft and so forth, may be utilized.

The wire routing system 100 includes one or more brackets 110 that are advantageously attached to the fluid rail 104. The brackets 110 guide wires 112 at least partially across any part of the fluid rail 104 and away from the valve operation mechanism 106. The brackets 110 retain the wires 112 away from the fluid rail 104, including, but not limited to, near the fluid rail 104, as well as any of parallel to, perpendicular to, and at any other angle with respect to the fluid rail 104. Because the fluid rail 104 may be cast with a rough finish and may contain high pressure fluid that may cause the fluid rail to vibrate, the brackets 110 advantageously prevent the wires 112 from touching the fluid rail 104 to prevent the wires 112 from undergoing unnecessary wear and tear and/or from shorting out and/or cracking into an intermittent or open circuit. The wires 112 are connected to the fuel injectors 102 and/or sensors 108 via injector connectors 114 and sensor connectors 116, respectively. As shown in FIG. 1, the wires 112 from the fuel injectors 102 and/or sensors 108 terminate in connector housings 118 that are disposed in or next to a valve cover gasket 119. In the configuration shown, the wires 112 are disposed in and pass through the gasket 119 before terminating in the connector housings 118. The wire routing system 100 also includes a wiring harness 120 that electrically connects the terminations of the wires in the connector housings 118 with the ECM/IDM 122. Intermediate connections, segments, junctions, and/or components may be part of the wire routing system 100. Any number of wires 112 may be connected to the injector connectors 114 and the sensor connectors 116. The connector housings 118 provide intermediary connection points for wires 112 between the bracket 110 and the harness 120, permitting the wires 112 to be installed in segments, thereby facilitating easier installation.

The fuel injectors 102 are part of an electronically operated fuel injection system, such as, for example, a hydraulically activated electronically controlled unit injection (HEUI) fuel injection system, an electro-hydraulic generation two (G2) fuel injection system, piezo common rail injection system, and so forth. The actuating mechanism of the fuel injector 102 may be, for example, an electrical-to-mechanical energy conversion device such as a solenoid, piezo-transducer, and so forth. The actuating mechanism may operate a control valve or other mechanism in the fuel injector 102.

The ECM/IDM 122 may comprise one or more microprocessors with electrical circuitry that operates at least a part of the engine. The ECM/IDM 122 provides electrical control signals through the wires 112 to at least partially control the fuel injectors 102. The electrical control signals are interpreted by the fuel injectors 102 as known in the art. The ECM/IDM 122 monitors electrical signals from the sensor 108 through the wires 112. The ECM/IDM 122 may provide other functions.

One or more sensors 108 may include an injection control pressure (ICP) sensor, a brake control pressure (BCP) sensor, an engine operating parameter sensor, and so forth. The engine may have multiple sensors 108 disposed under the valve cover.

The injector connectors 114, sensor connectors 116, connector housings 118, and harness 120 may be electrical interconnects or other wire joining mechanisms. The electrical interconnects may be, for example, mated plug and receptacle devices. The injector connectors 114 and the connector housings 118 may be, for example, DTM04-3P wire interconnects manufactured by the Deutsch Industrial Products Division of Hemet, Calif. The sensor connectors 116 may be, for example HD10-9 diagnostic interconnects manufactured by Deutsch Industrial Products Division of Hemet, Calif. The harness 120 may be configured as a single receptacle with multiple plugs, multiple receptacles with multiple plugs, a distributed connection system, and so forth. Other electrical interconnects may be used. The injector connectors 114, the sensor connectors 116, and the main connector 120 may be the same type or a combination of different types of electrical interconnects. Electrical connections may be provided by any suitable method or technology, including soldering, crimping, twisting, splicing, low or zero insertion force technology, and so forth, and/or combinations thereof. The injector connectors 114 may be connected to or disposed near the fuel injectors 102. The sensor connectors 116 may be connected to or disposed near the sensors 108. The connector housings 118 and the main connector 120 may be disposed under the valve cover, in the valve cover gasket, outside the valve cover, and so forth, in any combination.

Figure 2:
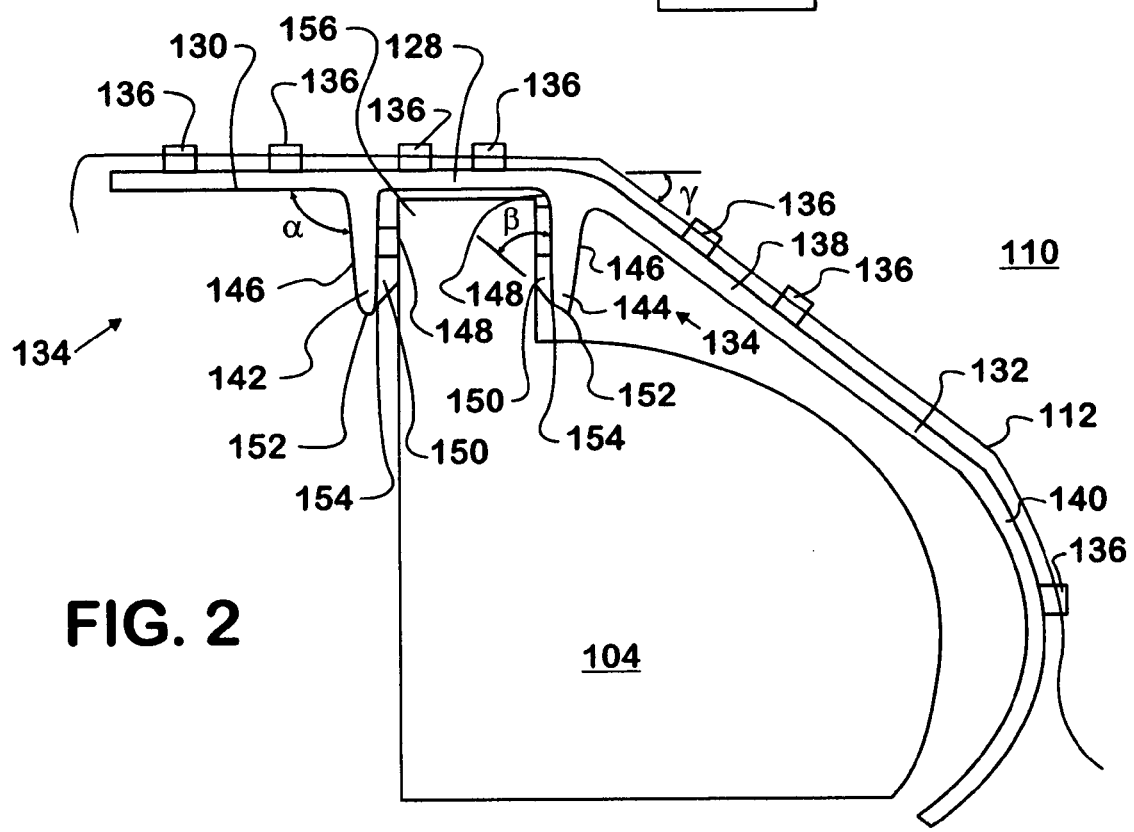
FIG. 2 is a side view of a bracket mounted on a fluid rail in accordance with the invention.

A cross-sectional view of a bracket 110 mounted on the fluid rail 104 in the wire routing system 100 is shown in FIG. 2. The bracket 110 has a base 128 connected to an arm 130 and a extension 132. The arm 130 and the extension 132 may be aligned or at an angle with each other and with the base 128.

The extension 132 has a support 138 and a tail 140. The support 138 may be substantially straight and form an angle, γ, with the base 128. The angle, γ, may be in the range of about 30 degrees through about 40 degrees, and may advantageously be close to 36 degrees. Other angles may be used to provide adequate clearance between the support 138 and other surrounding engine components. The tail 140 may be curved. The support 138 and tail 140 may have other configurations.

The bracket 110 advantageously has a mounting mechanism 134 that mounts the bracket 110 onto the fluid rail 104. For example, the base 128 of the bracket 110 is shown mounted on the fluid rail 104 in FIG. 2. The mounting mechanism 134 includes a first leg 142 and a second leg 144. The first leg 142 and the second leg 144 each have a support surface 146 and a mounting surface 148. Other mounting mechanisms may be used to attaching the bracket 110 to the fluid rail 104, such as a fastener, bolt, clip, and so forth.

Each support surface 146 of the first and second legs 142 and 144 forms an angle, α, with the base 128. The angle, α, may be selected to increase or decrease a biasing force of the legs 142 and 144 against the fluid rail 104. The angle, α, may be about 90 degrees or greater, for example, in the range of about 95 degrees through about 100 degrees. The angle α may advantageously be close to 97 degrees. Other angles may be used to provide an adequate biasing force to retain the first and second legs 142 attached to the fluid rail 104 during engine operation.

The mounting surfaces 148 of the first leg 142 and the second leg 144 are shown facing each other. The mounting surfaces 148 may advantageously be substantially perpendicular to the base 128 and parallel to each other. Each mounting surface 148 has a protrusion 150 near an end 152 opposite the base 128. Each protrusion 150 extends from the mounting surface 148. Each protrusion 150 may be perpendicular to the mounting surface 148. The protrusion 150 on the first leg 142 and the protrusion 150 on the second leg 144 may advantageously be aligned. The end 152 and protrusion 150 of each leg may optionally have a common flat surface 154 that forms an angle, β, with the mounting surface 148. The angle β may be in the range of about 30 degrees through about 40 degrees. The angle β may advantageously be close to 35 degrees. Other angles may be used.

When assembled with the wire routing system 100 in the engine, the bracket 110 is advantageously positioned with the base 128 above a pedestal 156 of the fluid rail 104. The arm 130 faces a side of the fluid rail 104 where the fuel injectors 102 are located. The extension 132 faces a side of the fluid rail 104 where the wires 112 are coming from the ECM/IDM 122. The first leg 142 and second leg 144 are positioned on the sides of the pedestal 156. The base 128 is advantageously adjacent to the top of the pedestal 156. The first leg 142 and the second leg 144 may move or slide along the sides of the pedestal 156. When the protrusions 150 engage the sides of the pedestal 156, the first leg 142 and the second leg 144 may bend or flex slightly away from the pedestal 156. This bend or flex may increase the force of the first leg 142 and second leg 144 through the protrusions 150 and against the pedestal 156. Any increase in the force increases the hold or grip of the bracket 110 on the fluid rail 104. The pedestal 156 may have indentations or holes to receive the protrusions 150.

The bracket 110 advantageously has one or more retainers 136 that guide and/or retain the wires 112 with the bracket 110 in a location either on or near the bracket 110. The wires 112 are advantageously retained such that the bracket 110 is disposed between the wires 112 and the fluid rail 104 or other engine component. The retainers 136 may be disposed anywhere along the bracket 110, including, for example, along the base 128, the arm 130, the extension 132, the support 138, and/or the tail 140. Each section, e.g., 128, 130, 132, 138, and 140, of the bracket 110 need not necessarily have a retainer 136. The number, type, and location of the retainers 136 on the bracket 110 may vary. The retainers 136 may include holders, closable clips, channels, tying mechanisms, and so forth, or any combination thereof. The combination of location and retainer type may also vary.

Figure 21:
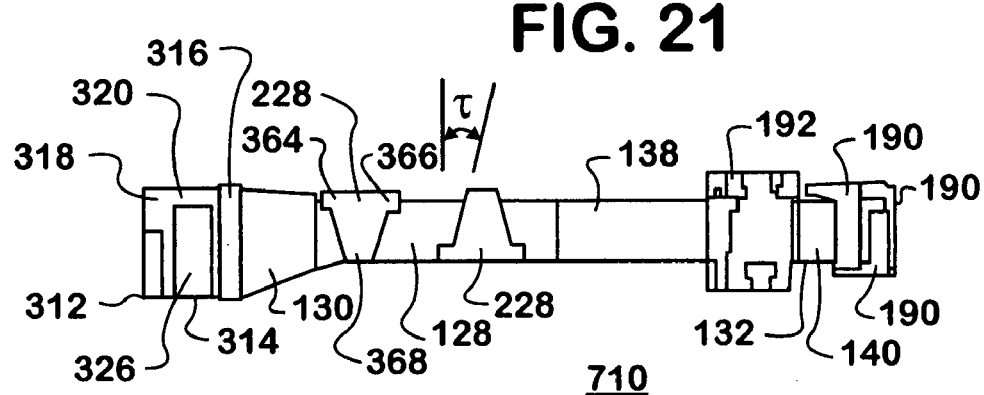
FIG. 21 is a top view of the bracket in FIG. 20 in accordance with the invention.

A retainer 136 may be a holder, such as the wire holder 158 shown in FIG. 3, FIG. 4, FIG. 5, and FIG. 7, the wire holder 190 shown in FIG. 8, FIG. 9, FIG. 12 through FIG. 14, FIG. 17, FIG. 18, FIG. 20, and FIG. 21, or the wire holder 228 shown in FIG. 20 and FIG. 21. A wire holder may have an L, U, hook, or other suitable configuration, and may be made from a rigid and/or semi-rigid material. The material of the retainer 136 may undergo plastic or elastic deformation when engaging the wires 112. The wires 112 are retained in a passage 170 between the bracket 100 and the holder 158, 190, and 228. Multiple holders 158, 190, and/or 228 may be disposed near each other and/or on alternating sides of the bracket 110 to improve wire retention and/or routing.

A retainer 136 may be a closable clip, such as the closable clip 196 shown in FIG. 13 through FIG. 16. A closable clip may have a U or other suitable configuration, and may be made from a flexible material, a rigid and/or semi-rigid material, or a combination of a flexible material with a rigid and/or semi-rigid material. The material may undergo plastic or elastic deformation. The wires 112 are positioned on the bracket 110 near the closable clip 196. The closable clip 196 is bent or folded around the wires 112. The wires 112 are retained in the passage 206 between the closable clip 196 and the bracket 510.

A retainer 136 may be a tying mechanism, such as a cable tie, wire, cord, adhesive tape, or other flexible material that ties or secures the wires to the bracket 110. The tying mechanism may advantageously include one or more notches formed in the bracket, such as the notches 160 shown in FIG. 3, FIG. 4, FIG. 7, FIG. 13, and FIG. 14. The notches 160 may be indentations or grooves formed in the bracket 110, for example, along the side edges of the bracket 110. The notches 160 may be advantageously arranged in pairs on opposite sides of the bracket 110. The tying device at least partially fits in the notches 160 and encircles the wires 112 between the notches 160 when tied. After tying, the ends of the tying device are typically cut short as needed to avoid entanglement or interference with components under the valve cover. The notches 160 prevent or restrain movement of the tying device along the bracket 110. The notches 160 may have other locations and orientations than those shown in the figures.

The brackets 110 and wires 112 may be pre-assembled before installation on the engine. The wires 112 may be routed through the retainers 136 and connected to the injector connectors 114, sensor connectors 116, connector housings 118, and/or main connector 120. The pre-assembled bracket 110 is mounted onto to the fluid rail 104, the injector connectors 114 are connected with the fuel injectors 102, and the sensor connectors 116 are connected with the sensors 108.

FIG. 3 through FIG. 6 show various views of an alternative bracket 210 for the wire routing system 100. A plurality of holders 158 retain wires 112 with the arm 130, and a plurality of notches 160 are utilized to retain wires 112 with the extension 132.

The alternative bracket 210 utilizes retainers 136 in the form of holders 158, such as the opposing holders 158 shown disposed on the arm 130 of the bracket 210. As shown in FIG. 5, the holder 158 has an upright 164, a cross-piece 166, and an extender 168. The upright 164 connects to one side of the arm 130 and extends substantially perpendicularly from the arm 130. Placement of the uprights 164 on the bracket 210 provides the ability to prevent wires 112 from becoming entangled with objects outside the uprights 164. The cross-piece 166 connects to the upright 164 and extends across the arm 130 to the opposite side. The extender 168 extends from the cross-piece 166 toward the arm 130. A gap 172 permits entry of the wires 112 between the extender 168 and the arm 130. As shown in FIG. 3, the gaps 172 on adjacent holders 158 are on opposite sides of the bracket 210, as are the uprights 164, to help prevent the wires 112 from leaving through the gaps 172. The holder 158 is advantageously integrally formed, and may optionally be formed as part of the bracket 210.

Figure 6:
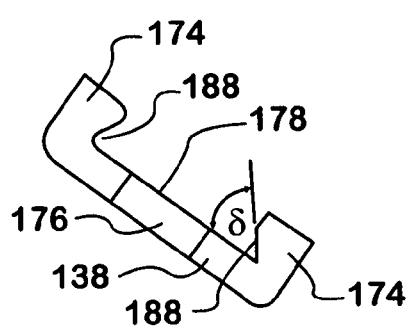
FIG. 6 is a cross-section view taken along line II-II of the bracket in FIG. 3 in accordance with the invention.

A connector holder 162 is positioned on the support 138 near the base 128. A sensor connector 116 or other device may be disposed in the connector holder 162. The connector holder 162 may be configured to mate with the outer perimeter of the sensor connector 116. The connector holder 162 has ridges 174 on opposite sides, with a channel 178 between the ridges 174. A cavity 176 may be formed in the support 138 between the ridges 174 to facilitate or accommodate a projection on the sensor connector 116 when it is installed in the connector holder 162. As shown in FIG. 6, the ridges 174 have a slot 188 forming an angle, δ, with the support 138 to better mate with or accommodate the outer perimeter of the sensor connector 116. The angle δ may be in the range of about 45 degrees through about 50 degrees, and may advantageously be close to 49 degrees. Other angles may be used. The bracket 210 may be used without a connector in the connector holder 162.

Figure 7:
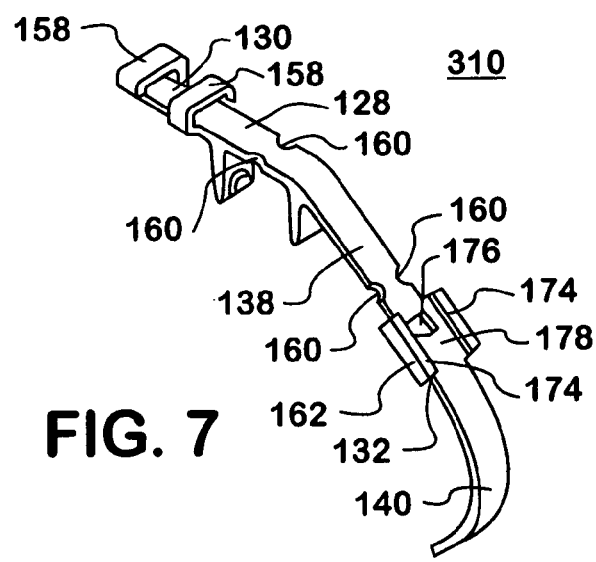
FIG. 7 is a perspective view of another alternative bracket for a wire routing system in accordance with the invention.
Figure 8:
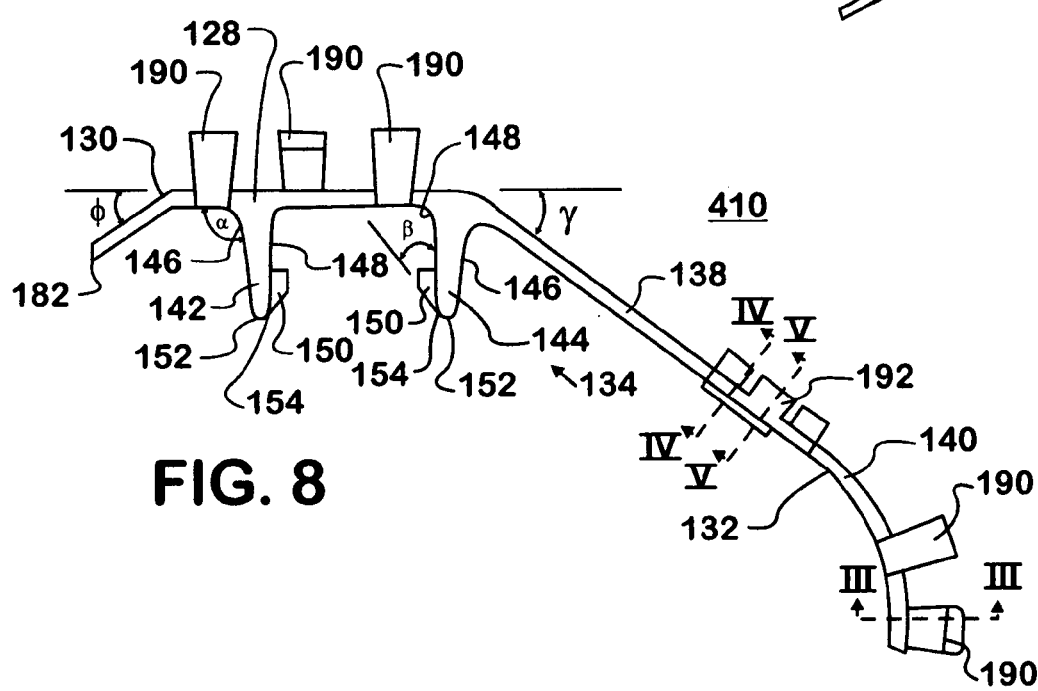
FIG. 8 is a side view of an additional bracket for a wire routing system in accordance with the invention.

FIG. 7 is a perspective view of an alternative bracket 310 for the wire routing system 100. In this embodiment, the base 128 has a pair of notches 160 near the mounting mechanism 134, the extension 132 has a pair of notches 160, and the connector holder 162 is located between the notches 160 in the extension 132 and the tail 140. The retainers 136 also include holders 158.

FIG. 8 through FIG. 12 show various views of an alternative bracket 410 for the wire routing system 100. In this embodiment, the bracket 410 has an arm 130 that forms an angle, φ, with the base 128. The angle φ may be in the range of about 30 degrees through about 40 degrees, and may advantageously be close to 34 degrees. Other angles may be used. An optional tip 182 may have a smaller cross-section than the arm 130. Wires 112 are retained by a plurality of alternative holders 190 disposed on the base 128 and the tail 140. An alternative connector holder 192 is also provided. A sensor connector 116 may be mounted on the connector holder 192.

Figure 9:
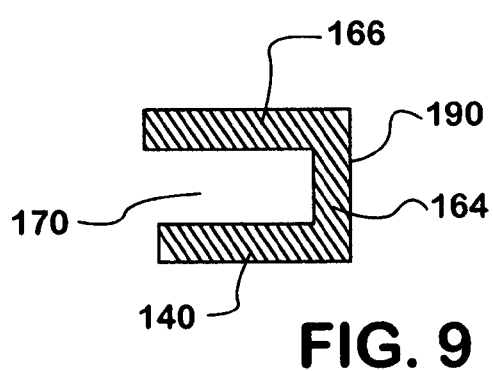
FIG. 9 is a cross-sectional view taken along line III-III of the bracket in FIG. 8 in accordance with the invention.

The alternative holders 190 are disposed on the bracket 410 in opposing orientations for adjacent holders 190. The alternative holders 190 are similar to the holders 158, except that the passage 170 for the wires 112 is open on one side, as shown in FIG. 9. This embodiment of the alternative holder 190 has the advantage of being easier and less expensive to manufacture, as well as providing easier installation for the wires 112. The uprights 164 on adjacent holders 158 are on opposite sides of the bracket 410 to help prevent the wires 112 from "walking out" through the side of the passage 170. The holder 190 is advantageously integrally formed, and may optionally be formed as part of the bracket 410.

The alternative connector holder 192 is disposed on the support 138. A sensor connector 116 or other device may optionally be disposed in the connector holder 192. The connector holder 192 may be configured to mate with the outer perimeter of the sensor connector 116. The alternative connector holder 192 has fingers 194 on opposite sides, with a channel 178 between the fingers 194. There may be any number of fingers 194. A cavity 176 may be formed in the support 138 between the fingers 194 to facilitate a projection on the sensor connector 116 when it is installed in the connector holder 192. A ledge 184 and an angled slot 188 facilitate mating with a sensor connector 116. The ledge 184 is substantially parallel with the support 138 and forms an angle, ε, with the edge of the angled slot 188. The angle ε may be in the range of about 45 degrees through about 50 degrees, and may advantageously be close to 49 degrees. Other angles may be used. The bracket 410 may be used without a connector disposed in the connector holder 192.

FIG. 13 through FIG. 16 show various views of an alternative bracket 510 for the wire routing system 100. The bracket 510 is this embodiment utilizes notches 160, holders 190, and a connector holder 162 as previously described. This bracket 510 utilizes closable clips 196 to retain wires 112 with the bracket 510.

The closable clip 196 is shown open in FIG. 15 and closed in FIG. 16 with a hinge 198, a member 200, and a clasp 202. The hinge 198 may be a flexible material or rotating structure that attaches to or is formed along the side of the bracket 510. The member 200 connects to the hinge 198 and the clasp 202. The clasp 202 extends substantially perpendicularly from the member 200. The clasp 202 has a slot 204 with a substantially mating shape to the side bracket 510, such that when the clasp 202 is closed, the slot 204 fits over the side of the bracket 510 and engages it, as shown in FIG. 16. The clasp 202 may flex or bend when closing to engage the bracket 510. The member 200 and clasp 202 may be made from a flexible, rigid, and/or semi-rigid material. The hinge 198, member 200, and clasp 202 may be made from the same material. The hinge 198 may have a smaller cross section than the member 200. The closable clips 196 may have other configurations. The clip 196 is closed after wires 112 are disposed in a passage 206 between the member 200 and the bracket 510, thereby retaining the wires 112 with the bracket 510.

FIG. 17 through FIG. 19 show various views of an alternative bracket 610 for the wire routing system 100. The arm 130 forms a first angle, φ as shown in FIG. 17, and a second angle, τ as shown in FIG. 18, with the base 128. The angle, φ, may be in the range of about 30 degrees through about 40 degrees and may be advantageously close to 34 degrees. The angle, τ, may be in the range of about 30 degrees through about 40 degrees and may be advantageously close to 34 degrees. Other angles for φ and τ may be used.

The arm 130 is shown with a connector holder 212. The connector holder 212 is shown having a platform 214, a first wall 216, a second wall 218, and a lip 220. The first wall 216 and the second wall 218 are disposed on opposite sides of the platform 214. The first wall 216 and second wall 218 are substantially parallel to each other and extend substantially perpendicularly from the platform 214. The lip 220 is disposed on one side of the platform 214 and extends from the first wall 216 to the second wall 218. The first wall 216 and the second wall 218 have a stop 222 opposite the lip 220. The first wall 216 and the second wall 218 may have one or more tabs 224 extending away from the platform 214. Each tab 224 forms an angle, θ, with the respective wall. The angle θ may be in the range of about 30 degrees through about 40 degrees may advantageously be close to 33 degrees. Other angles may be used. The connector holder 212 is advantageously integrally formed with the bracket 610.

An injector connector 114 or sensor connector 116 may be disposed in the channel 226 of the connector holder 212. The platform 214, the first wall 216, the second wall 218, the lip 220, the stops 222, and/or the tabs 224 retain the injector connector 114 or sensor connector 116 in the channel 226. Other connectors may be disposed in the connector holder 212. The bracket 610 may be utilized without a connector disposed in the connector holder 192 and/or connector holder 212.

Figure 22:
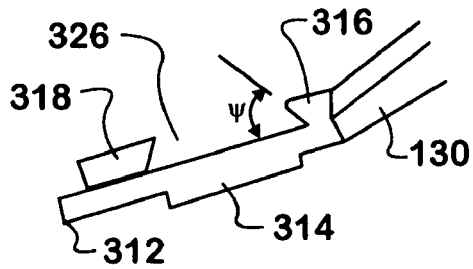
FIG. 22 is perspective front view of the bracket of FIG. 20 in accordance with the invention.

FIG. 20 through FIG. 22 show various views of an alternative bracket 710 for the wire routing system 100. The arm 130 of the bracket 710 is shown with a saddle 312. The saddle 312 has a platform 314, a first wall 316, a second wall 318, and a lip 320. The first wall 316 and the second wall 318 are on opposite ends of the platform 314. The first wall 316 and second wall 318 are substantially parallel to each other and extend from the platform 314. The first wall 316 and second wall 318 each form an angle, ψ, with the platform 214. The angle ψ may be in the range of about 45 degrees to about 50 degrees and may advantageously be close to 49 degrees. Other angles may be used. The lip 320 is disposed on one side of the platform 314 and extends from the first wall 316 to the second wall 318. The saddle 312 is advantageously integrally formed with the bracket 710. An injector connector 114 or sensor connector 116 may be disposed in the channel 326 of the saddle 312.

A plurality of alternative holders 228 are utilized to retain wires 112 with the bracket 710. The alternative holders 228 connect to the bracket 710 on opposite orientations with respect to each other. The alternative holders 228 are similar to the holders 158, except that the alternative holders 228 have a tapered cross-piece 366. The cross-sectional area of the tapered cross-piece 366 reduces from the upright 364 to the end 368. Alternatively, the cross-piece 366 may have at least two non-parallel surfaces. The tapered cross-piece 366 forms an angle, σ, on each side with the upright 364. The angle σ may be in the range of about 15 degrees through about 20 degrees and may advantageously be close to 18 degrees. Other angles may be used.

Figure 23:
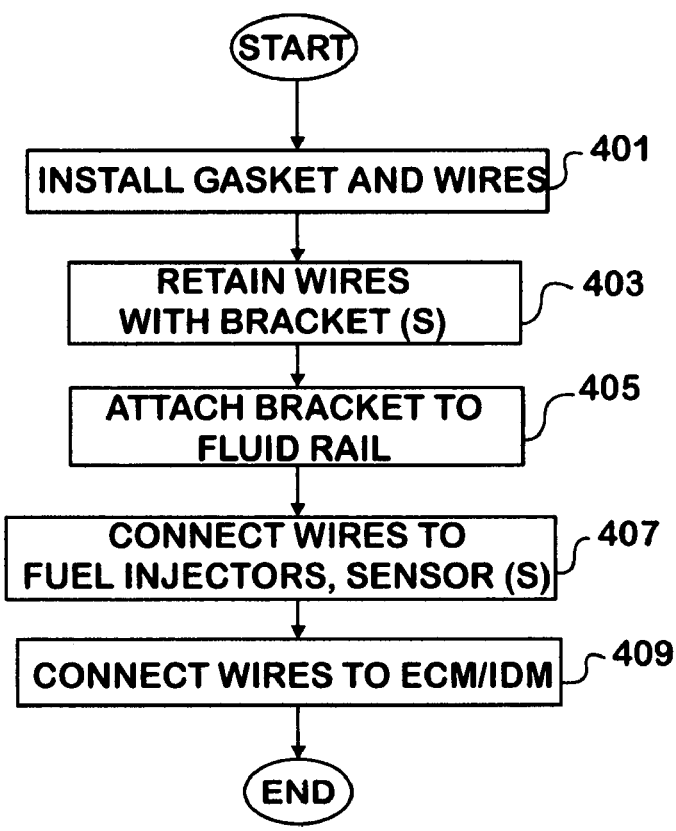
FIG. 23 is a flowchart of a method for routing wires in accordance with the invention.

A flowchart showing a method of routing wires to a fuel injection system is shown in FIG. 23. At step 401, a valve cover gasket 119 and wires 112 are installed on the cylinder head of the engine. At step 403, the wires 112 are retained with one or more brackets 110, 210, 310, 410, 510, 610, and/or 710 by the retainers 136. At step 405, the mounting mechanism 134 of each bracket 110, 210, 310, 410, 510, 610, and/or 710 is attached to the fluid rail 104 by placing the fluid rail 104 between the legs 142 and 144 of the mounting mechanism 134. Advantageously, the wires 112 are installed such that the wires do not touch the fluid rail 104 or valve operation mechanism 106 when the mounting mechanism 134 is attached to the fluid rail 104. At step 407, the wires 112 are connected to the fuel injectors 102 and sensor(s) 108 by attaching the injector connectors 114 and sensor connectors 116, respectively. The wires 112 are guided across the fluid rail 104 without touching it, thereby preventing the wires 112 from undergoing unnecessary wear and tear and/or protecting the wires 112 from other damage that could result from the wires 112 touching a sharp and/or vibrating device such the fluid rail 104 and the moving valve operation mechanism 106. The wires 112 may partially or completely span the fluid rail 104 from one side or end of the fluid rail to another side or end of the fluid rail. At step 409, the wires 112, that are terminated in the connector housings 118, are connected to the wiring harness 120 and to the ECM/IDM 122.

Although the first bracket 110 is set forth in FIG. 1 and described therewith, any bracket 110, 210, 310, 410, 510, 610, or 710 or combination of brackets may be utilized successfully in the wire routing system 100. The brackets 110, 210, 310, 410, 510, 610, and/or 710 advantageously support or hold the wires 112 nearby but not touching the fluid rail 104. The brackets 110, 210, 310, 410, 510, 610, and/or 710 for the fuel injectors 102 and sensors 108 may be the same or different brackets. The brackets 110, 210, 310, 410, 510, 610, and/or 710 may be made from aluminum, plastic, or other suitable material or combination of materials. The brackets 110, 210, 310, 410, 510, 610, and/or 710 may be molded as a single device with integral retainers 136 and/or holders 162 or 192, or they may be formed of separate pieces. The features of the various embodiments of the brackets 110, 210, 310, 410, 510, 610, and/or 710 that have similar reference numerals are not described for each embodiment to avoid needless repetition. Other combinations of the various features, such as notches 160, holders 158, 190, and 196, and holders 162 and 192, of the brackets 110, 210, 310, 410, 510, 610, and/or 710 as well as the shape and structures of the bracket itself may also be utilized without deviating from the spirit of the invention. The wire routing system 100 may have other configurations, including those with additional components. The engine may have an in-line, V, or other configuration. The engine may have six, eight, or another number of cylinders. The engine may be fueled by gasoline, diesel fuel, or other fuels.

The wiring system described herein provides numerous advantages. Entanglements of wires with the valve operation mechanism are avoided, including, for example, wires under the valve cover of an internal combustion engine. Wires are guided over the fluid rail without touching it, to prevent the wires from chafing or becoming worn from rubbing against the fluid rail, which may be sharp and vibrating at a relatively-high frequency. Flexibility of wire retainers provides numerous ways to adequately retain wires without creating added expense or complexity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus comprising:
   a bracket;
   at least one retainer disposed on a first side of the bracket;
   a mounting mechanism disposed on a second side of the bracket such that the mounting mechanism grips a fluid rail;
   wires disposed in the at least one retainer, wherein the at least one retainer retains the wires adjacent to the bracket and away from the fluid rail;
   wherein the bracket is disposed between the wires and the fluid rail;
   a plurality of end connectors connected to the wires;
   a main connector electrically connected to the plurality of end connectors and to an engine control module.

2. The apparatus of claim 1, wherein the at least one retainer comprises at least one of a wire holder, a clip, and a tying mechanism.

3. The apparatus of claim 1, wherein the mounting mechanism compnses:
   a first leg extending from a base and having a first protrusion;
   a second leg extending from the base and having a second protrusion;
   wherein the first protrusion opposes the second protrusion.

4. The apparatus of claim 1, wherein the bracket comprises a base connected to an arm and an extension.

5. The apparatus of claim 4, further comprising a connector holder disposed on the bracket.

6. The apparatus of claim 5, further comprising a sensor connector disposed in the connector holder, wherein at least one of the wires connects to the sensor connector.

7. The apparatus of claim 5, further comprising an injector connector disposed in the connector holder, wherein at least one of the wires connects to the injector connector.

8. The apparatus of claim 1, comprising a plurality of retainers disposed on alternating sides of the bracket.

9. The apparatus of claim 1, wherein the wires include at least one pair of injector wires and at least one sensor wire, wherein the at least one pair of injector wires conned to an injector connector, and wherein the at least one sensor wire connects to a sensor connector.

10. A bracket for a wire routing system comprising:
    a base connected to an ami and an extension, wherein the extension has a support and a tail;

at least one retainer that retains at least one wire and is disposed on the bracket;

a first leg extending from the base and having a first protrusion on a first leg mounting surface;

a second leg extending from the base and having a second protrusion on a second leg mounting surface;

wherein the first protrusion opposes the second protrusion;

wherein the first protrusion and the second protrusion grip a component such that the bracket is mounted to the component.

11. The bracket of claim 10, wherein the at least one retainer comprises at least one of a wire holder, a clip, and a tying mechanism.

12. The bracket of claim 11, further comprising:

a pair of notches in the support;

a connector holder disposed on the support;

wherein the at least one retainer is a closable clip and disposed on the arm.

13. The bracket of claim 10, further comprising:

a plurality of wire holders disposed on the arm;

a plurality of notches in the support;

a connector holder disposed on the support between the base and a pair of the plurality of notches.

14. The bracket of claim 10, further comprising:

a plurality of wire holders connected to the arm;

a first pair of notches in the base;

a second pair of notches in the support; and a connector holder disposed on the support between the second pair of notches and the tail.

15. The bracket of claim 10, further comprising:

a first plurality of wire holders disposed on the base;

a second plurality of wire holders disposed on the tail;

a connector holder disposed on the support.

16. The bracket of claim 15, further comprising a connector holder disposed on the arm.

17. The bracket of claim 10, wherein the first protrusion and the second protrusion each have a flat surface, and wherein the first protrusion and the second protrusion form an angle.

18. The bracket of claim 10, wherein the first leg and the second leg are deformed when installed on the pedestal of the fluid rail and impart a biasing force onto the pedestal.

* * * * *